R. S. GRIGSBY.
Ventilator.
No. 197,775. Patented Dec. 4, 1877.
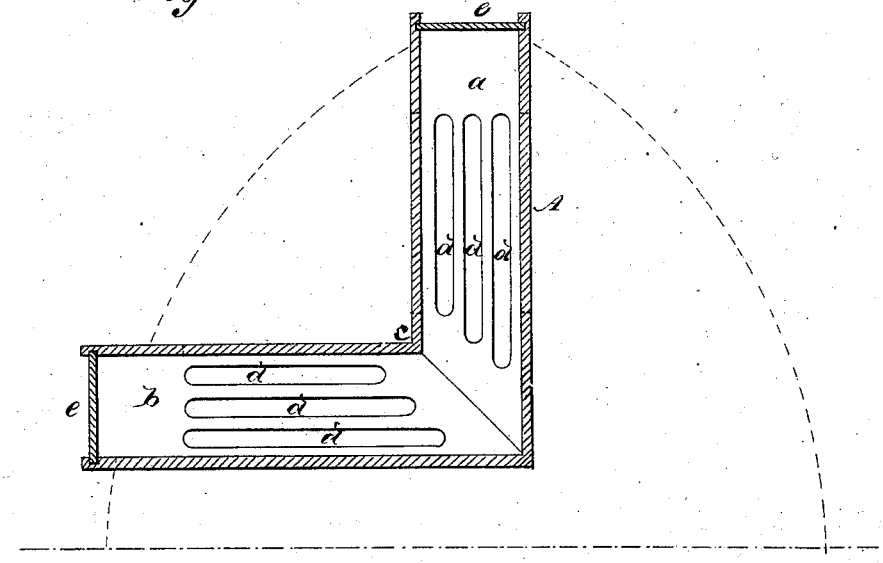
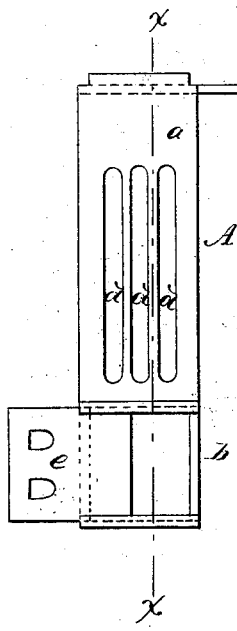
WITNESSES:
INVENTOR:
ATTORNEYS.

UNITED STATES PATENT OFFICE.

RUSH S. GRIGSBY, OF FAYETTEVILLE, TENNESSEE.

IMPROVEMENT IN VENTILATORS.

Specification forming part of Letters Patent No. 197,775, dated December 4, 1877; application filed September 1, 1877.

*To all whom it may concern:*

Be it known that I, RUSH S. GRIGSBY, of Fayetteville, in the county of Lincoln and State of Tennessee, have invented a new and Improved Ventilator, of which the following is a specification:

Figure 1 is a vertical section taken on the line $x$ $x$ in Fig. 2. Fig. 2 is a front elevation.

Similar letters of reference indicate corresponding parts.

My invention relates to an improved device for ventilating piles of fruit; and it consists of a right-angled tube having slotted sides, and provided with sliding doors for closing its outer ends.

In the drawing, A is the ventilator, which consists of the parts $a$ $b$, mitered together at $c$, and provided with slots $d$ in their sides, and with sliding doors $e$ at their outer ends.

Instead of mitering two parts together, as described, the vertical part may be attached to the center of a longer horizontal part, forming an inverted T-shaped ventilator.

The size of the ventilator may be varied to adapt it to piles or banks of fruit of different sizes.

The manner of using the ventilator is as follows: About one-fourth of the fruit which is to form the bank or pile is put down and the ventilator is put into its place. The fruit is then piled up around the vertical portion of the ventilator, as shown in dotted lines in Fig. 1. The sliding doors may be opened more or less, as circumstances may require.

The device is cheaply made from boards or other suitable material, and it is effective in ventilating the interior of a pile of fruit.

The device may be applied to and form part of a fruit-house; but it is especially adapted for ventilating piles of such fruit and vegetables as are liable to heat and rot, as it carries away the damp, heated air, and furnishes a constant supply of cool, pure air to the interior of the pile.

Having thus described my invention, what I claim as new, and desire to secure by Letters Patent, is—

A ventilating angle-pipe for fruit or vegetable banks or piles, having slots $d$ and end doors $e$, a sufficient portion of solid pipe being left between the slots and ends to allow said slots to be entirely within the bank or pile, as shown and described.

RUSH SCOTT GRIGSBY.

Witnesses:
 A. B. WOODARD,
 P. T. BAYER.